United States Patent

[11] 3,610,745

[72] Inventor James Mark Wilson
4919 Regel Oak Drive, Encino, Calif. 91316
[21] Appl. No. 846,899
[22] Filed Aug. 1, 1969
[45] Patented Oct. 5, 1971

[54] VISUAL EFFECTS COMBINING MOTION PICTURES AND THREE DIMENSIONAL OBJECTS
6 Claims, 6 Drawing Figs.
[52] U.S. Cl. .................................................. 352/40, 352/85
[51] Int. Cl. ................................................. G03b 21/32
[50] Field of Search .......................................... 352/3, 40, 48, 49, 53, 54, 85, 86, 88, 89, 90; 350/120, 124; 272/10, 9, 12, 8

[56] References Cited
UNITED STATES PATENTS
| | | | |
|---|---|---|---|
| 1,260,221 | 3/1918 | McCormick .................. | 352/40 |
| 1,372,969 | 3/1921 | McCormick .................. | 352/40 UX |
| 1,734,467 | 11/1929 | Howard ......................... | 352/120 |
| 2,198,815 | 4/1940 | Haskin .......................... | 352/40 |
| 2,466,214 | 4/1949 | Deaton .......................... | 352/54 UX |
| 3,085,877 | 4/1963 | Reid .............................. | 352/49 |
| 666,714 | 1/1901 | Towers ......................... | 272/12 X |
| 688,539 | 12/1901 | McMahon .................... | 272/10 |

Primary Examiner—Donald O. Woodiel
Attorney—Herzig & Walsh

ABSTRACT: Motion pictures are projected onto a screen. A physical three-dimensional object is held in a position in front of the screen where it is visible to a viewing audience along with the motion pictures. The object is supported or suspended in such a way that its support is not visible to the viewing audience. In the preferred form of the invention the three-dimensional object is supported from the screen itself by way of a support between the object and the screen and the entire screen is movable vertically and horizontally. When the screen and the object are moved the picture stays in the same position. As a result, extraordinary effects can be produced wherein the physical object appears to be moving relative to the background picture projected on the screen.

INVENTOR.
JAMES MARK WILSON,
Herzig & Walsh
ATTORNEYS.

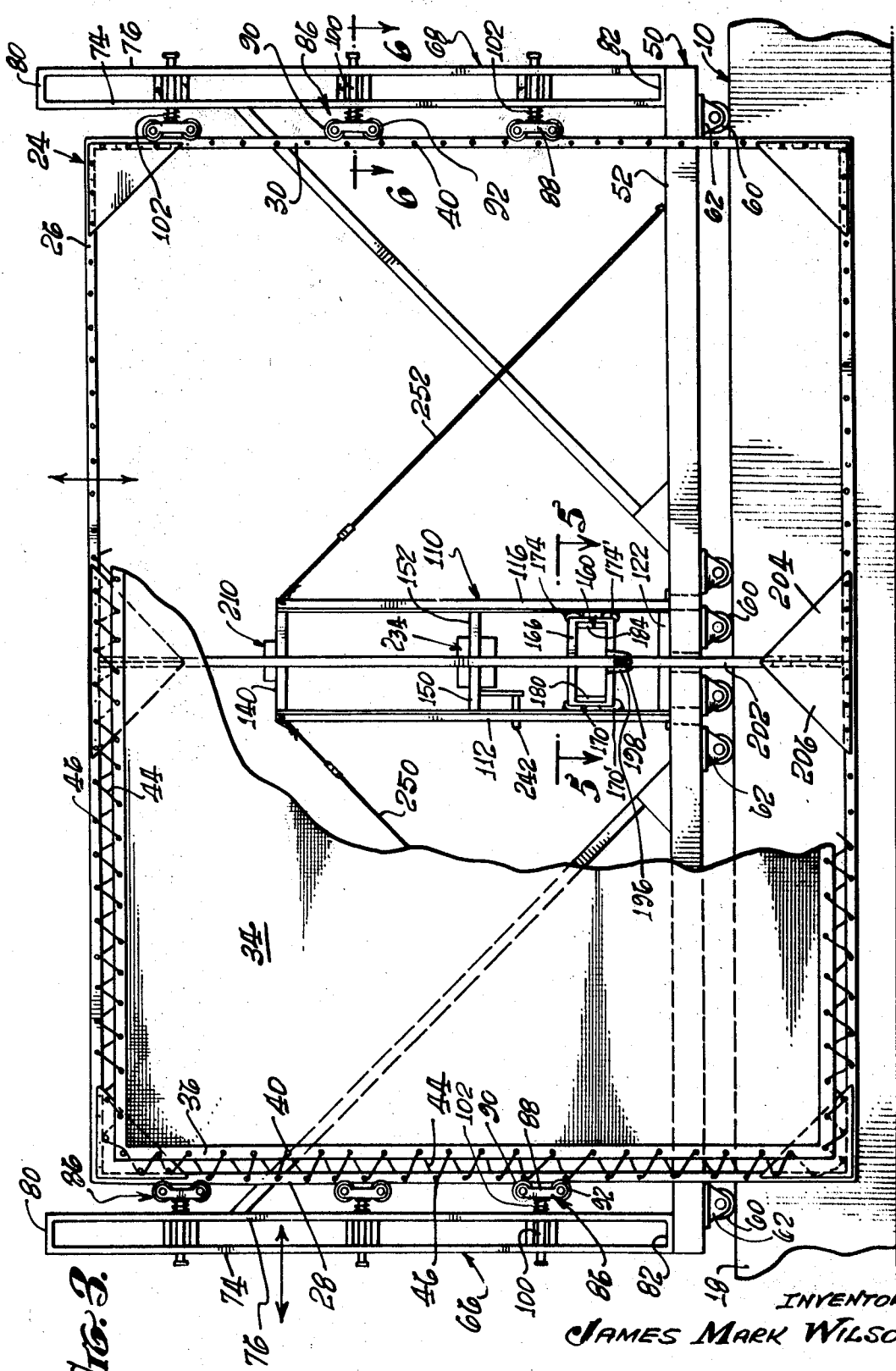

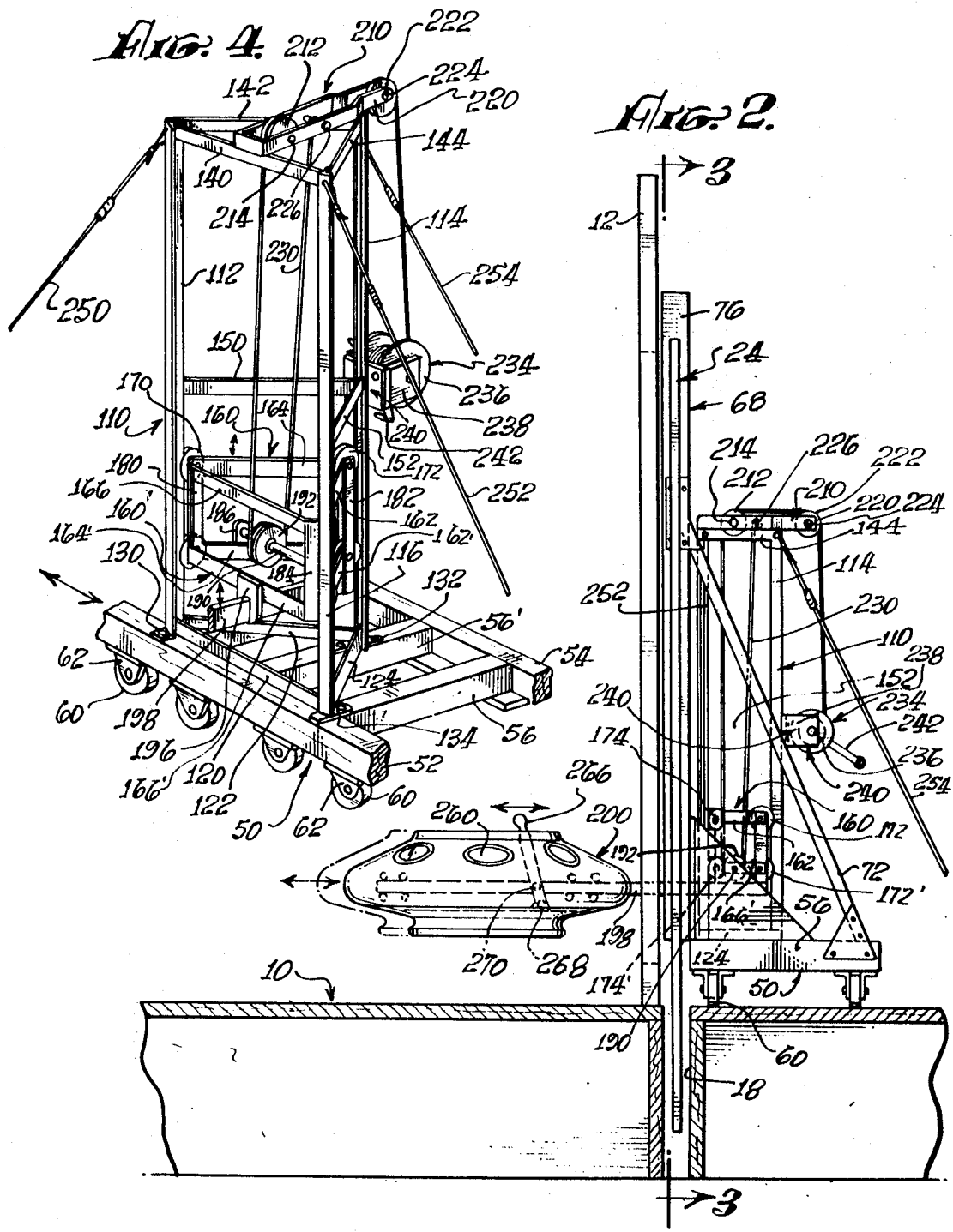

3,610,745

VISUAL EFFECTS COMBINING MOTION PICTURES AND THREE DIMENSIONAL OBJECTS

SUMMARY OF THE INVENTION

The invention relates to apparatus and method for producing visual effect wherein the projection of motion pictures is combined with a physical object associated with the projected pictures. The physical object is supported in front of the screen in such a way that its support is not visible to the viewing audience. In the preferred form of the invention this is accomplished by supporting the physical object directly from the screen by a member between the object and the screen, and then mounting the screen so that it is movable vertically and horizontally. An operator behind the screen manipulates it to move it vertically and horizontally so that the supported object moves with the screen while the projected picture remains stationary. In other words, the effect is that the physical object, which may itself be movable on its mountings appears to be moving relative to the picture projected on the screen which stays in the same position. As can readily be seen this combination of movable three dimensional objects and a projected background scene which stays in the same position makes it possible to produce extraordinary visual effects which are fascinating, highly entertaining and of a nature that cannot readily be duplicated in other ways.

Thus, by way of example, and as described herein in connection with a preferred exemplary embodiment of the invention, the three-dimensional object may be one that simulates a flying saucer mounted forward of the movable screen. The background scene that is projected onto the screen may, of course, be one that accommodates itself to creation of an extraordinary effect when it is viewed with the three-dimensional flying saucer directly in front of it. For example, the effect produced may be for example, that of a flying saucer traveling down a canyon between the canyon walls at terrific velocity, and maneuvering itself following the canyon. Other comparable effects varying widely and offering unlimited possibilities for producing extraordinary displays become possible.

In the light of the foregoing, the primary object of the invention is to provide apparatus and methods for the production or creation of extraordinary visual effects by combining the projection of motion pictures with a physical object or objects.

Another object is to provide means for implementing the preceding object wherein a physical object is supported in front of a screen on which motion pictures are projected, the support being invisible to a viewing audience and the object being movable relative to the projected picture.

Another object is to provide means for implementing the foregoing objects wherein the physical object is mounted directly from the screen which is made to be movable in horizontal and vertical directions so that by moving the screen the physical object is moved while the projected picture remains stationary. Further objects and additional advantages of the invention will become apparent from the following detailed description and annexed drawings, wherein:

FIG. 2 is a view taken along the line 2-2 of FIG. 1;

FIG. 3 is a sectional view taken along the line 3-3 of FIG. ;

FIG. 4 is a perspective view of the support mechanism whereby the screen is made movable;

Figure 1:
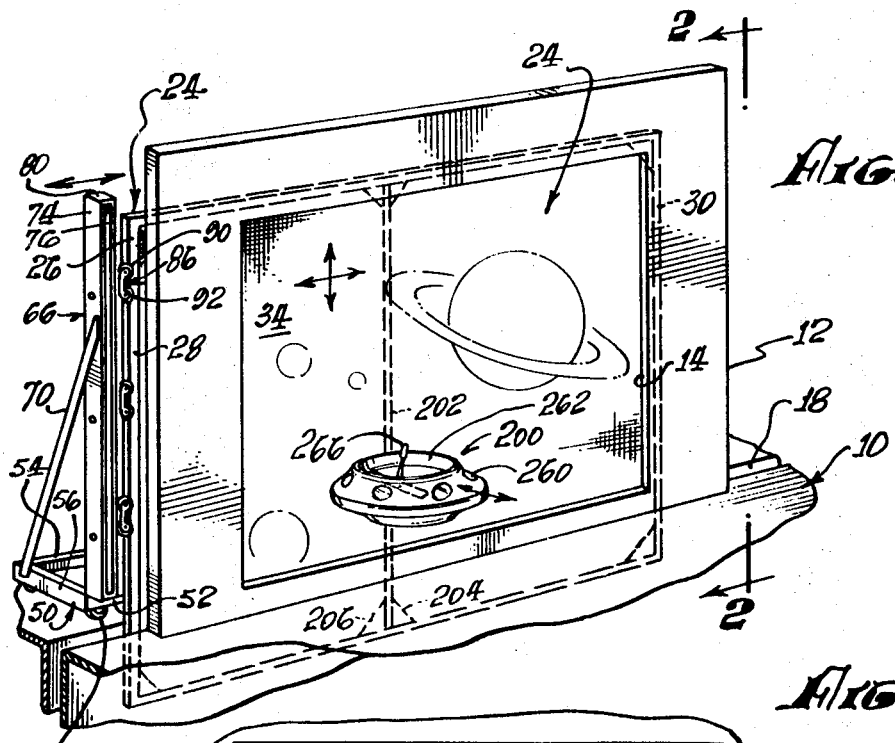
FIG. 1 is a perspective view of a preferred form of the invention

FIGS. 1 to 6 of the drawings illustrate a preferred form of the invention. In this form of the invention the screen is mounted so that it can be moved horizontally and vertically. The physical object, which is a simulated flying saucer is mounted directly from the front of the screen so as to move with it. When the screen and the flying saucer are moved the projected picture, of course, remains stationary.

Numeral 10 designates a stage or platform on which is carried the movable screen. Supported on the platform 10 is a frame 12 which is rectangular having a rectangular opening or window 14 in it with the screen behind this window. The platform 10 has a transverse slot or opening 18 in it, and the screen extends down into the opening, the screen being movable horizontally and vertically as will be described.

The screen is designated by the numeral 24. It comprises a rectangular frame 26 having top and bottom members and side members as designated at 28 and 30 in FIG. 3. The actual screen material on which the pictures are projected is designated at 34 and it may be made of a suitable flexible fabric having border edge 36 in which eyelets as shown as for example at 40 for attachment of the fabric to the rectangular frame 26. The fabric screen 34 is supported from the frame 26 by way of lacing as designated at 44 which are laced back and forth between the eyelets 40 in the border of the screen 34 and eyelet holes 46 in top, bottom and side members of the frame 26.

The entire screen 24 including the frame 26 is carried on a trolley or carriage which is movable transversely that is, horizontally, and the entire screen 24 is movable vertically on the trolley. The horizontally movable trolley or carriage is designated as a whole by the numeral 50. It comprises a chassis having front and back elongated members 52 and 54 which may be made of wood as shown in FIG. 4 and extending between these members are transverse members 56 as shown which may also be made of wood. Underneath each of the members 52 and 54 are provided a plurality of support rollers such as shown at 60, these rollers being supported in support members 62 on transverse axles, the support members 62 being attached underneath the elongated members 52 and 54. Thus, it may be seen that the entire carriage for the screen can be rolled transversely or horizontally carrying the entire screen with it, as will be described, the screen extending down into the slot 18.

Figure 6:
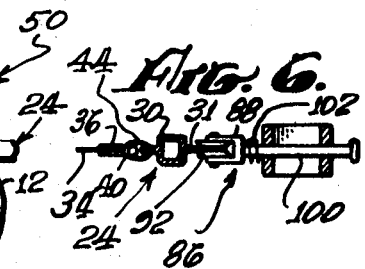
FIG. 6 is a sectional view taken along line 6-6 of FIG. 3.

At the opposite ends of the members 52 and 54 of the chassis 50 are provided vertical uprights as designated at 66 and 68. These uprights are supported just forwardly of the elongated member 52 and are braced by way of brace members as shown at 70 and 72. The uprights 66 and 68 are alike and as shown they are formed of spaced members 74 and 76 spaced by upper and lower parts 80 and 82 to be of box like configuration. Each of the uprights 66 and 68 supports a plurality of roller carriages having rollers which engage the side members 28 and 30 of the frame 26. One of these roller carriages is designated at 86. (See FIG. 6) It comprises a U-shaped frame such as designated at 88 between which are journaled a pair of roller members 90 and 92 on transverse axles journaled in the member 88. The carriage or chassis 86 is mounted on the end of a stem such as shown at 100 which extends transversely through the upright 68, as shown. Between the upright 68 and the chassis 86 is a coil spring 102 which urges the rollers 90 and 92 against the frame member 30 of the frame 26. The frame members, as may be seen at 30 in FIG. 6 are square in cross section having an extending flange or web 31, forming a rail for the wheels as shown at 92. As shown there are three of the roller carriages for the screen frame supported from each of the uprights 66 and 68, and since they are all alike the others need not be described in detail. It may be observed, however, that the entire frame assembly 24 is readily movable vertically between the uprights 66 and 68 of the carriage 50, the screen frame moving in the slot 18.

The entire screen frame is supported from a scaffold or frame structure that is carried in an upright position on the carriage 50. This support structure or frame is designated generally at 110 in FIGS. 2 and 4 and as shown it is of triangular configuration comprising three uprights or posts 112, 114 and 116 which may be angle members arranged to form an equilateral triangle as may be seen in FIG. 5. Preferably the uprights 112, 114 and 116 are of T-shaped cross section, the legs of the T of each one extending inwardly towards the center of the triangle. (See FIG. 5) At the bottom of the uprights 112, 114 and 116 are three brace or strut members 120, 122, and 124 extending between the uprights and suitably secured thereto. At the bottom ends of the uprights 112, 114 and 116 are feet or pad members 130, 132, and 134 which are suitably secured to the elongated member 52 and one of the transverse members 56 designated at 56' for holding the frame structure 110 erect and supporting it.

At the upper end of the uprights 112, 114 and 116 are three similar brace members or strut members 140, 142 and 144 suitably secured to the uprights. Midway between the upper and lower ends of the uprights 112, 114 and 116 is another pair of brace or strut members 150 and 152, the member 150 extending between the uprights 112 and 114 and the member 152 extending between the uprights 114 and 116 and suitably secured thereto.

The frame or structure 110 forms a support and guide track or shaft for a vertically moving elevator carriage designated generally at 160. This carriage is triangular as may be seen in FIG. 4 and 5 and is provided with rollers that can move vertically within the triangular structure 110. The carriage 160 comprises three upper frame members 162, 164 and 166 as may be seen in FIG. 5, arranged to form a triangle. As may be seen the adjacent ends of these frame members are bent so as to be parallel, and between these adjacent parallel ends there are provided three grooved rollers as designated at 170, 172 and 174 these rollers being journaled on transverse axles. The rollers are positioned as may be seen so that they engage the inwardly extending flanges or legs of the uprights 112, 114 and 116. That is, the inwardly extending flanges of these uprights form tracks for the rollers 170, 172 and 174. At the lower end of the elevator carriage 160 is a similar frame designated at 160' mounting a plurality of similar rollers designated 170', 172' and 174'. (See FIG. 4) the upper and lower triangular frames 160 and 160' are three spacers or frame members 180, 182 and 184.

The sides 162' and 164' of the lower frame member 160' have up standing lugs as designated at 186 and 188 between which is journaled a shaft 190 on which is a pulley 192.

The frame member 166' of the lower frame 160' carries a bracket 196 and extending forwardly from this bracket is a support member 198 which extends forwardly through the screen and which supports the simulated flying saucer designated generally at 200. The member 198 is attached to a further vertical member 202 which extends downwardly to the lower transverse member of the frame 26 to which it is firmly secured by means of the triangular brace member 204 and 206 as may be seen in FIG. 3.

Supported on the upper end of the triangular construction 110 is a rectangular or U-shaped frame 210. Numeral 212 designates a pulley journaled on a shaft 214 between the sides of the frame 210. The frame 210 has legs extending rearwardly from the structure 110, one of these being designated at 220 and between these legs is a further pulley 222 journaled on a shaft 224. Between the sides of the frame 210 is a rigid stem 226 to which is attached the end of a cable 230 which passes around the pulley 192 and then passes over pulleys 212 and 222 and extends down to a manually operable cable reel or windlass 234 which is journaled on a shaft 236 extending between legs such as leg 238 of support bracket 240. On the shaft 236 is provided a crank handle as designated at 242.

The upright support structure 110 is held secure and rigid by way of guy lines or cables 250 to 252 and 254 attached to its top triangular corners and the other ends of these guy cables being suitably secured to points on the chassis 50.

Figure 5:
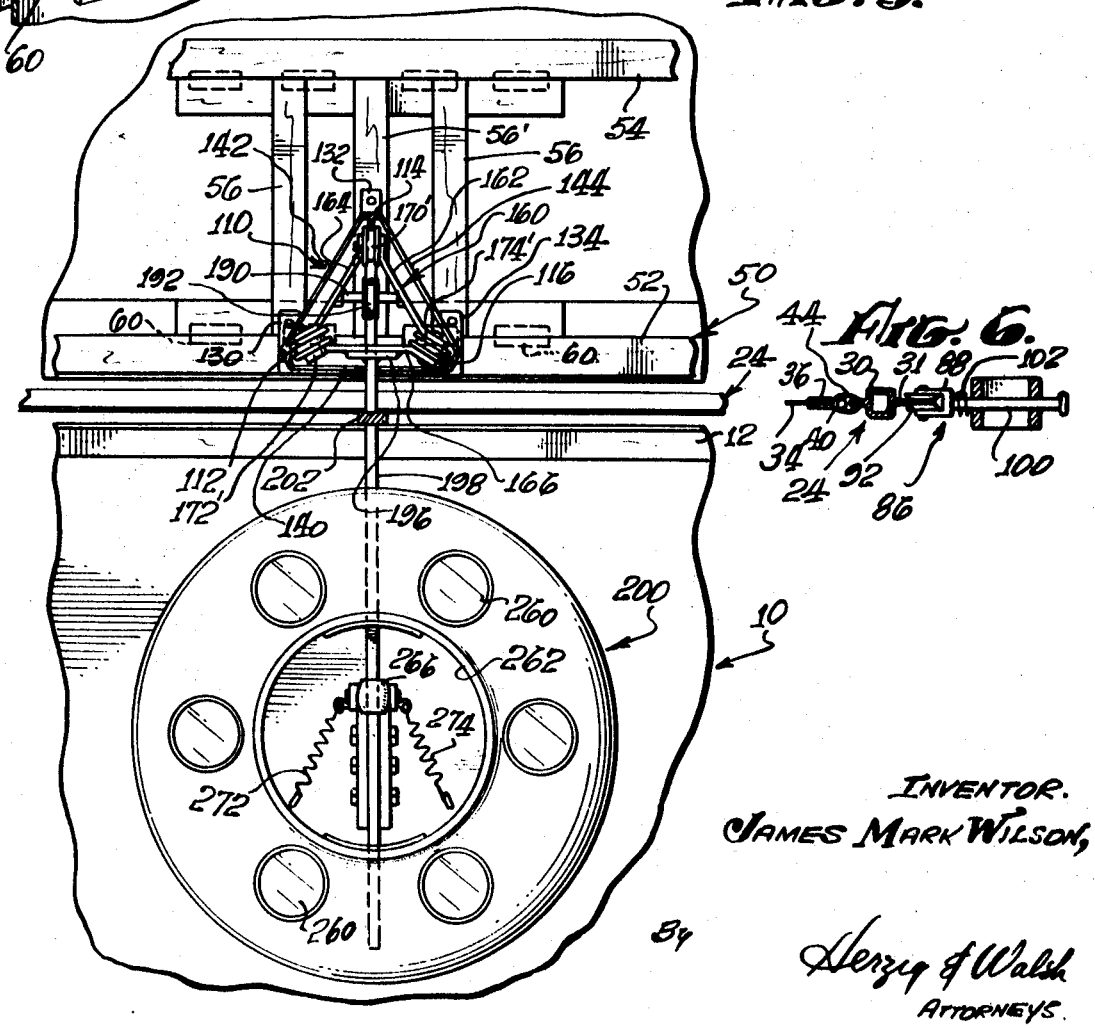
FIG. 5 is a sectional view taken along the line 5-5 of FIG. 3.

The three dimensional object, that is, the flying saucer, 200, preferably has configuration like that as may be seen in FIG. 2 and 5, that is, a configuration corresponding to that generally attributed to flying saucers, having simulated port holes 260 around its upper surfaces. It has a circular center opening 262 forming a cockpit in which an operator can sit and as may be seen, it is supported on the extending member 198 which extends along a diameter of the flying saucer. A person can sit in the cockpit 262 with his legs straddling the bar or member 198. Numeral 266 designates a control handle the lower end of which is pivotally attached in the lower part of the flying saucer as designated at 268, the handle being pivotally attached to the bar 198 at 270. The lever 266 is bifurcated so that it can straddle the bar 198 and it is attached the interior of the cockpit 262 by springs 272 and 274. Thus the operator can manipulate the handle 266 to produce movement of the flying saucer 200. It can be moved in and out relative to the screen by manipulating the handle 266 and tilted to one side or the other to simulate the movements that it would have while traversing space.

From the foregoing, the nature and utilization of the invention is readily apparent. An operator is positioned behind the screen to be able to operate the handle 242 of the reel 240. In this position the operator can operate the reel to raise and lower the carriage 160 in its operating shaft thereby simultaneously to raise or lower the entire screen while at the same time the entire screen can be moved horizontally, that is, the carriage 50 can traverse laterally. Of course, movement of the flying saucer 200 accompanies any such movement imparted to the screen. The projected picture, of course, remains in the same position since it does not move with the screen or with the flying saucer. The operator can see the picture on the screen from behind it. The extraordinary and fascinating effects that can be produced are, therefore, readily apparent. Visual effects are obtainable which would be virtually impossible to achieve otherwise. The picture projected can, of course, be a complete geographical or space background, the three dimensional saucer 200 appearing to be a part of it and moving relative thereto. The background picture can, of course, be filmed from a moving camera and then when the film is projected with the flying saucer 200 in position the effect is that of the saucer moving relative to the background. The phenomenon is thereby achieved of having a visual effect which is the same as that of an actual flying saucer moving through or traversing the projected background.

Thus, it may be seen that the embodiment of the invention described in detail illustrates the principle which is that of mounting the physical object in a position in which it is transposed in front of a projected picture in a position wherein it is movable without its support being visible to the viewing audience. In the preferred form it is simply mounted to the screen which is made movable while the projected picture remains fixed. It is intended, of course, that the invention shall embrace all equivalent forms and ways of implementing its principles.

The foregoing disclosure is representative of a preferred form of the invention and is to be interpreted in an illustrative rather than a limiting sense, the invention to be accorded the full scope of the claims appended hereto.

What is claimed is:

1. A method of creating visual effects combining a physical object and motion pictures comprising positioning a physical object in front of a screen, projecting pictures on the screen, movably supporting the object in a manner such that its support is not visible to the viewing audience, and then imparting movement to the object such that it appears to be part of the picture projected on the film, including the step of mounting the screen to be movable in its plane and supporting the object fixedly with respect to the screen and then moving the screen and object together while the projected picture remains stationary.

2. A method as in claim 1 including the step of connecting the object to the screen at a position obscured from the viewing audience.

3. A method as in claim 2 including the step of moving the screen and object in both vertical and horizontal planes so that the object moves relative to the projected picture which remains stationary.

4. Apparatus for creating visual effects combining a physical object with a projected picture comprising in combination, a screen on which pictures are projected, a physical object mounted in front of the screen by way of mountings that are invisible to a viewing audience, means for moving the physical object relative to the projected picture, the screen being mounted to be movable in its plane and the physical object being mounted fixedly with the mountings of the screen to move therewith while the projected picture remains stationary.

5. An apparatus as in claim 4 wherein the physical object is mounted directly to the screen, the mounting comprising means extended from the physical object to the screen in a position to be not visible to the viewing audience.

6. An apparatus as in claim 5 wherein the physical object is in the form of a simulated flying saucer.